UNITED STATES PATENT OFFICE.

ENRICO ROSENZI, OF PITTSBURG, PENNSYLVANIA.

COMPOSITION OF MATTER FOR MOLDED ARTICLES TO RESEMBLE GLASS AND IRON.

SPECIFICATION forming part of Letters Patent No. 244,486, dated July 19, 1881.

Application filed April 4, 1881. (No specimens.)

*To all whom it may concern:*

Be it known that I, ENRICO ROSENZI, a citizen of the United States, residing at Pittsburg, in the county of Allegheny and State of Pennsylvania, have invented certain new and useful Improvements in Composition of Matter; and I do hereby declare the following to be a full, clear, and exact description of the invention, such as will enable others skilled in the art to which it appertains to make and use the same.

My invention relates to a new and useful composition of matter for molded articles to resemble glass and iron; and it consists in an admixture and fusion of the ingredients in about the proportion as hereinafter stated.

This composition, when in a state of fusion, may be treated like glass in the same condition, to give it the desired form, by either pressing or blowing; or it may be run into molds, like iron or other metals, and will, when cooled, retain not only its shape and form, but also present a permanently-glazed surface. It is hard, like glass, without its brittleness, and in strength resembles iron. It can be made transparent, translucent, or opaque, or shades of various colors may be given to it by the addition of coloring-matter. It is impermeable to moisture or water, and acids do not affect it, nor does it rust or become oxidized when in contact with moisture. It resists the changes of temperature to a high degree, and does not crack when exposed to sudden variations from hot to cold.

This composition, when by artificial means its temperature has been raised above its normal status, retains the added degree of temperature after the cause of its increase has been removed much longer than glass or metal, and this quality, combined with the foregoing, fits it especially for certain domestic and culinary utensils that are now made exclusively of iron.

The characteristic of this composition, as detailed in the foregoing, shows that it may be substituted for glass and put to many uses where glass, owing to its brittleness, has not been and cannot be employed.

The following-named ingredients, in about the given proportion, enter into and form this composition: clean sand, one hundred parts; coal-ashes, forty parts; lime, (burned,) ten parts; arsenic, magnesia, borax, and soda, in variable quantities.

I prepare and mix the named ingredients as follows: The sand, after being well washed and dried, is sifted and freed from all coarse particles. The coal-ashes are likewise sifted and everything that is not ashes removed therefrom. The lime, well burned and free from iron and sulphur, is reduced to an impalpable powder. These three ingredients, when duly prepared, are well and thoroughly mixed in the given proportion. On the bottom, in the crucible, is placed a layer of arsenic, and on this the mixture of sand, coal-ashes, and lime. In order to clear the mixture during the process of melting, magnesia, soda, or borax, in quantities to produce the desired effect, is added.

If desired to impart a color to the material in the crucible, coloring-matter is introduced while the mixture is in a fused or in an incandescent state, according to the character of the coloring substance.

As hereinbefore stated, the mass obtained from the mixture of the various ingredients of this composition, when in a fluid or fused condition, may be treated like glass under the same circumstances, and be made to assume any form by the means applied to the latter.

In giving the said proportion of this composition, I do not wish to be understood that a slight deviation therefrom would change its essential character, for the ingredients, not always being alike, may necessitate a change in their relative quantities to obtain the desired result. I therefore reserve to myself the privilege of making such changes in the named proportion of the material as circumstances may require.

To distinguish this composition by name from others I call it "Ferroline."

Having thus described my invention, I claim—

The described composition, consisting of sand, coal-ashes, lime, arsenic, magnesia, soda, and borax, prepared and combined with or without coloring-matter in a manner substantially as described.

In testimony whereof I affix my signature in presence of two witnesses.

ENRICO ROSENZI.

Witnesses:
T. F. LEHMANN,
LOUIS MOESER.